United States Patent [19]

Howell

[11] 4,436,829
[45] Mar. 13, 1984

[54] GLASS FRITS CONTAINING $WO_3$ OR $MoO_3$ IN $RuO_2$-BASED RESISTORS

[75] Inventor: Robert G. Howell, Corning, N.Y.

[73] Assignee: Corning Glass Works, Corning, N.Y.

[21] Appl. No.: 345,574

[22] Filed: Feb. 4, 1982

[51] Int. Cl.³ .......................... C03C 3/08; C03C 3/10; C03C 3/30

[52] U.S. Cl. .................... 501/22; 252/518; 501/32; 501/75

[58] Field of Search .................. 501/22, 32, 75; 252/518

[56] References Cited

U.S. PATENT DOCUMENTS

| | | | |
|---|---|---|---|
| 2,557,545 | 6/1951 | Kerridge | 501/22 |
| 3,304,199 | 2/1967 | Faber et al. | 252/518 |
| 3,766,511 | 10/1973 | De Vries et al. | 252/518 |
| 3,916,037 | 10/1975 | Brady et al. | 252/518 |
| 3,924,221 | 12/1975 | Winkler | 252/518 |
| 4,286,251 | 8/1981 | Howell | 252/518 |

Primary Examiner—Helen M. McCarthy
Attorney, Agent, or Firm—C. S. Janes, Jr.

[57] ABSTRACT

This invention is concerned with the fabrication of thick film, $RuO_2$-based resistors. More specifically, this invention is directed to the formulation of glass frits for use in such resistors exhibiting temperature coefficient of resistance values of less than 100 ppm. Such glass frits consist essentially, expressed in terms of mole percent on the oxide basis, of about 32–39% PbO, 44–47% $B_2O_3$, 14–17% $SiO_2$, and an effective amount up to 5% of $WO_3$ or $MoO_3$.

2 Claims, 5 Drawing Figures

GLASS FRITS CONTAINING WO₃ OR MOO₃ IN RUO₂-BASED RESISTORS

BACKGROUND OF THE INVENTION

Hybrid integrated circuits are used extensively in the electronics industry for various purposes. One of the constituent parts of those devices is a thick film resistor. A thick film resistor is customarily fabricated by screen printing a paste which contains the conductor and resistor onto a substrate such as alumina. The coated substrate is fired at a temperature appropriate to the paste composition. The paste contains at least the following three necessary components; viz., a conducting phase, glass powder to bind the conducting phase and adhere to the substrate, and a vehicle, the latter commonly consisting of an organic polymer and solvent, to provide the proper consistency for screen printing.

Ruthenium dioxide ($RuO_2$) is widely employed in the industry as one of the conducting phases in thick film resistors, and glass frits having compositions within the $PbO-B_2O_3-SiO_2$ system have frequently constituted the bond. The composition of the frit is formulated to have a coefficient of thermal expansion approximating that of the alumina substrate material. Unfortunately, however, the temperature coefficient of resistance demonstrated by those products has been undesirably high. Hence, the products have exhibited temperature coefficients of resistance in excess of 100 ppm (parts per million).

Therefore, the principal objective of this invention is to develop thick film, $RuO_2$-based resistor compositions which can be suitably applied to alumina substrates in the conventional manner, but which manifest low temperature coefficients of resistance, viz., less than 100 ppm and, most preferably, less than 50 ppm.

SUMMARY OF THE INVENTION

That objective can be achieved with glass frits having compositions within the base $PbO-B_2O_3-SiO_2$ field but wherein $WO_3$ or $MoO_3$ is partially substituted for PbO. Upon heat treatment of the frit, crystals of $PbWO_4$ or $PbMoO_4$ are generated in situ. Their presence is responsible for the improved temperature coefficient of resistance. Accordingly, an amount of $WO_3$ or $MoO_3$ effective to promote the development of the desired crystal phase with a concomitant beneficial effect upon the temperature coefficient of resistance will be incorporated into the base glass composition. Whereas some desirable effect can be witnessed with smaller substitutions, a minimum of about 1 mole percent $WO_3$ or $MoO_3$ will, in general, be substituted for 1 mole percent PbO. Substitutions of $WO_3$ or $MoO_3$ for PbO in excess of about 5 mole percent can be employed, but such practice increases the cost of the glass, hazards undesirable changes in the physical properties of the base glass, and provides products exhibiting higher temperature coefficients of resistance than where lesser amounts of $WO_3$ or $MoO_3$ are utilized. Thus, the optimum effect is experienced at about 2–4 mole percent $WO_3$ or $MoO_3$. The inventive glass compositions consist essentially, expressed in terms of mole percent on the oxide basis, of about 32–39% PbO, 44–47% $B_2O_3$, 14–17% $SiO_2$, and an effective amount of $WO_3$ or $MoO_3$ up to 5%, with the preferred glasses containing about 2–4% $WO_3$ or $MoO_3$.

The heat treatment utilized to crystallize $PbWO_4$ or $PbMoO_3$ in situ comprises a substantive feature of the instant invention. Thus, temperatures between about 750°–950° C. are effective. The crystallization phenomenon is a function of time and temperature, with the growth of crystals proceeding more rapidly at higher temperatures. For example, a like volume of crystals may be developed after an exposure of only a few minutes at the upper end of the temperature range as would be generated after a much longer period, e.g., up to a few hours, at the cooler extreme of the range. Nevertheless, care must be exercised when utilizing temperatures in the hotter portion of the temperature range since excessively long exposures may lead to the resolution of the crystals in the base glass with consequent loss of effect upon the temperature coefficient of resistance. It is apparent, of course, that the minimum firing temperature employed is that sufficient to fuse the glass frit and cause adequate flow to produce a sound coating or film on the substrate.

DESCRIPTION OF PREFERRED EMBODIMENTS

Figure 1:
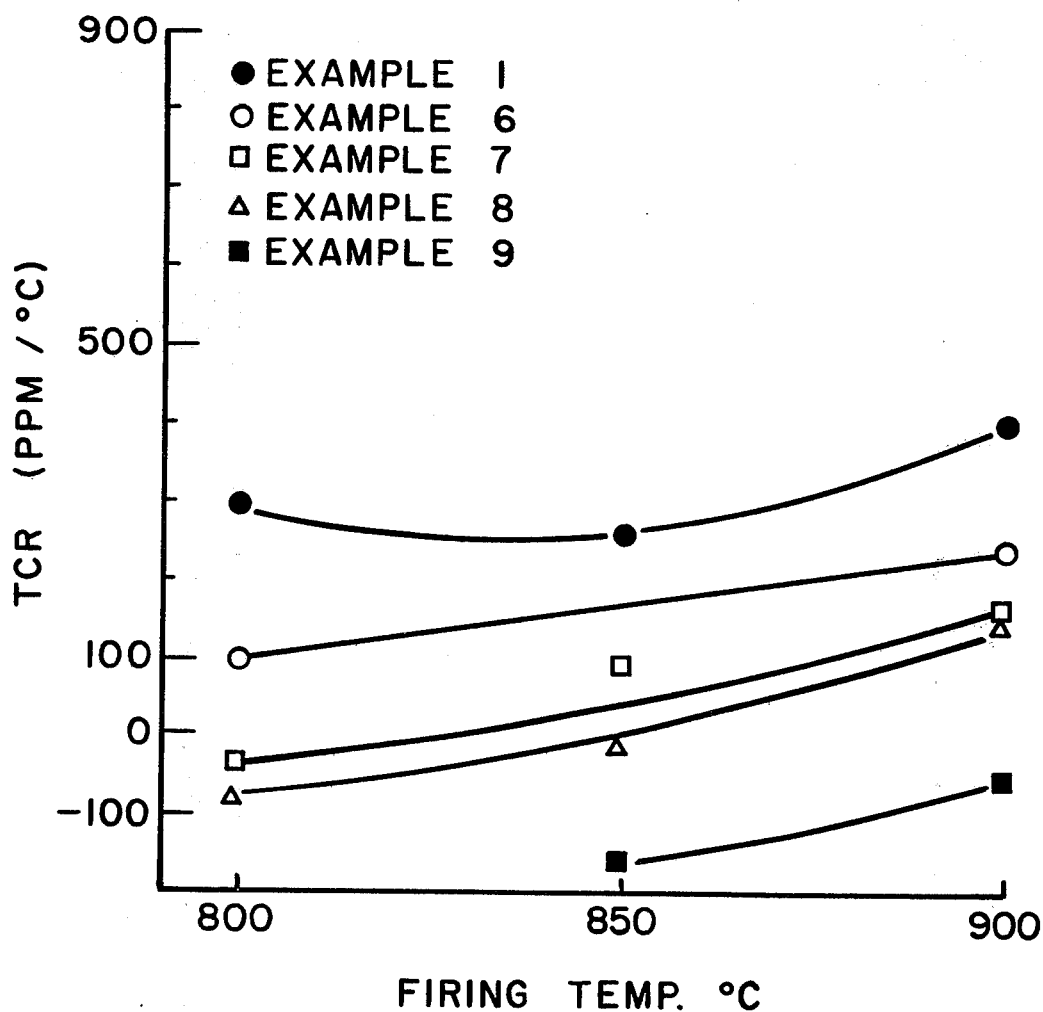
FIG. 1 provides a plot of TCR (temperature coefficient of resistance) demonstrated by several resistor inks versus changes in firing temperatures.

Table I records a group of exemplary glass compositions, expressed in terms of approximate mole percent on the oxide basis, designed to illustrate the present invention. Table IA reports the same glasses, expressed in terms of parts by weight on the oxide basis. Inasmuch as the sum of the individual ingredients totals or closely approximates 100, the values tabulated may, for all practical purposes, be deemed to reflect weight percent. The actual batch ingredients utilized may be any materials, either the oxide or other compounds which, when melted together, will be converted into the desired oxide in the proper properties.

The batch components were compounded, ballmilled together to assist in securing a homogeneous melt, the mixture turned into platinum crucibles, lids placed upon the crucibles, and the crucibles introduced into a furnace operating at about 1200° C. After four hours, the crucibles were removed from the furnace, the melt cocktail mixed to improve the homogeneity thereof, and the melt then poured as a thin stream into a container of water ("drigaged") to form finely-divided glass particles.

The glass particles were further reduced in size by ball milling in methanol employing alumina jars and cylinders. The average particle size was between 3–6 microns, as measured using a Coulter Counter.

A resistor ink was then prepared in the following manner. Each fritted glass was blended with about 12% by volume of $RuO_2$, the material used being Engelhard Lot RU-158, marketed by Engelhard Minerals and Chemicals Corporation, Iselin, N.J., containing about 75.15% Ru and having an average particle size of 2.6 microns. Approximately one gram of B. F. Drakenfeld 175 silk screeen oil, marketed by B. F. Drakenfeld, Washington, Pa., was added to each mixture and the resulting mass homogenized by mixing for 15 minutes in an automatic Fisher Mortar grinder, marketed by Fisher Scientific Co., Pittsburgh, Pa.

TABLE I

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 15.04 | 15.33 | 15.61 | 15.93 | 16.17 | 15.35 | 15.60 | 15.91 | 16.18 | 15.38 | 15.38 | 15.60 |
| $B_2O_3$ | 45.79 | 45.68 | 45.58 | 45.45 | 45.36 | 45.67 | 45.58 | 45.46 | 45.36 | 45.59 | 45.60 | 45.64 |
| PbO | 38.91 | 37.66 | 36.42 | 35.16 | 33.95 | 37.65 | 36.43 | 35.18 | 33.95 | 36.76 | 34.77 | 37.48 |
| $MoO_3$ | — | 1.07 | 2.13 | 3.20 | 4.26 | — | — | — | — | 1.00 | 2.00 | 0.5 |
| $WO_3$ | — | — | — | — | — | 1.07 | 2.13 | 3.20 | 4.25 | 1.00 | 2.00 | 0.5 |

TABLE IA

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 7.1 | 7.3 | 7.5 | 7.7 | 7.9 | 7.2 | 7.4 | 7.5 | 7.6 | 7.3 | 7.3 | 7.4 |
| $B_2O_3$ | 25.0 | 25.1 | 25.3 | 25.5 | 25.6 | 24.9 | 24.9 | 24.9 | 24.9 | 25.0 | 25.2 | 25.1 |
| PbO | 68.0 | 66.4 | 64.8 | 63.1 | 61.5 | 65.9 | 63.9 | 61.8 | 59.7 | 64.7 | 61.6 | 66.0 |
| $MoO_3$ | — | 1.2 | 2.4 | 3.7 | 5.0 | — | — | — | — | 1.1 | 2.3 | 0.6 |
| $WO_3$ | — | — | — | — | — | 1.9 | 3.9 | 5.8 | 7.8 | 1.8 | 3.7 | 0.9 |

A silver/palladium conductor was applied to an alumina substrate utilizing Du Pont's Ag/Pd-9601 conductor paste, marketed by E. I. Du Pont de Nemours & Co., Inc., Wilmington, Del., the application being undertaken by means of a camel's hair brush. In accordance with conventional practice, the paste film was dried in the ambient air for 10 minutes at 150° C. and thereafter fired in air for 10 minutes at 850° C.

The resistor inks were then silk screened onto the alumina substrates in the customary fashion to overlap the previously-applied conductor pads (deposits). The resultant film was dried for 10 minutes in the ambient air at 150° C.

Individual samples of the alumina substrates coated with the exemplary resistor inks were fired for 10 minutes in the ambient air at 800° C., 850° C., and 900° C. The samples were introduced directly into the furnace at the firing temperature (plunge firing) and immediately removed from the furnace to the ambient temperature environment after the 10-minute exposure. Plunge firing appears to yield somewhat lower temperature coefficients of resistance than where slower firing schedules are utilized.

A silver wire, about 2½" in length and about 0.025" in diameter, was soldered in known manner to each conductor pad employing 60/40 resin core solder. The sheet resistivity (p) in ohms/square and the temperature coefficients of resistance (TCR) in ppm/°C. were measured utilizing methods conventional in the glass art. Table II illustrates the fired thickness of each film, the resistivity of the film at room temperature, the resistivity normalized to a thickness of 0.001" at room temperature, the TCR, and the top temperature reached in evaluating the TCR.

TABLE II

| Example | Firing Temperature | Fired Thickness | Resistivity | Normalized Resistivity | TCR PPM/°C. | Top Temperature |
|---|---|---|---|---|---|---|
| 1 | 800° C. | 0.0015" | $3.216 \times 10^3$ | $4.824 \times 10^3$ | 294 | 194° C. |
| 1 | 850° C. | 0.0016" | $3.457 \times 10^3$ | $5.531 \times 10^3$ | 260 | 157° C. |
| 1 | 900° C. | 0.0015" | $1.840 \times 10^3$ | $2.76 \times 10^3$ | 405 | 144° C. |
| 2 | 800° C. | 0.0015" | $1.042 \times 10^3$ | $1.563 \times 10^3$ | 364 | 147° C. |
| 2 | 850° C. | 0.0016" | $0.843 \times 10^3$ | $1.349 \times 10^3$ | 365 | 157° C. |
| 2 | 900° C. | 0.0016" | $0.937 \times 10^3$ | $1.498 \times 10^3$ | 484 | 147° C. |
| 3 | 800° C. | 0.0014" | $15.64 \times 10^3$ | $21.896 \times 10^3$ | 18 | 157° C. |
| 3 | 850° C. | 0.0018" | $1.178 \times 10^3$ | $2.120 \times 10^3$ | 352 | 157° C. |
| 3 | 900° C. | 0.0017" | $0.5606 \times 10^3$ | $0.953 \times 10^3$ | 746 | 144° C. |
| 4 | 800° C. | 0.0018" | $951 \times 10^3$ | $1711.8 \times 10^3$ | −132 | 154° C. |
| 4 | 850° C. | 0.0022" | $18 \times 10^3$ | $39.6 \times 10^3$ | 43 | 154° C. |
| 4 | 900° C. | 0.0014" | $1.266 \times 10^3$ | $1.772 \times 10^3$ | 479 | 154° C. |
| 5 | 800° C. | 0.0017" | ∞ | — | — | — |
| 5 | 850° C. | 0.0017" | $236.9 \times 10^3$ | $402.7 \times 10^3$ | −135 | 154° C. |
| 5 | 900° C. | 0.0017" | $5.256 \times 10^3$ | $8.935 \times 10^3$ | 307 | 155° C. |
| 6 | 800° C. | 0.0012" | $1.928 \times 10^3$ | $2.314 \times 10^3$ | 97 | 155° C. |
| 6 | 850° C. | 0.0018" | $0.962 \times 10^3$ | $1.731 \times 10^3$ | 348 | 143° C. |
| 6 | 900° C. | 0.0015" | $1.530 \times 10^3$ | $2.295 \times 10^3$ | 240 | 135° C. |
| 7 | 800° C. | 0.0014" | $8.519 \times 10^3$ | $11.927 \times 10^3$ | −42 | 149° C. |
| 7 | 850° C. | 0.0014" | $2.063 \times 10^3$ | $2.888 \times 10^3$ | 89 | 146° C. |
| 7 | 900° C. | 0.0016" | $1.456 \times 10^3$ | $2.330 \times 10^3$ | 161 | 138° C. |
| 8 | 800° C. | 0.0014" | $84.17 \times 10^3$ | $117.84 \times 10^3$ | −75 | 170° C. |
| 8 | 850° C. | 0.0012" | $9.259 \times 10^3$ | $11.111 \times 10^3$ | −11 | 170° C. |
| 8 | 900° C. | 0.0015" | $1.667 \times 10^3$ | $2.501 \times 10^3$ | 145 | 156° C. |
| 9 | 800° C. | 0.0018" | ∞ | — | — | — |
| 9 | 850° C. | 0.004" | $81.64 \times 10^3$ | $326.56 \times 10^3$ | −167 | 155° C. |
| 9 | 900° C. | 0.0016" | $5.933 \times 10^3$ | $9.493 \times 10^3$ | −54 | 156° C. |
| 10 | 800° C. | 0.0016" | ∞ | — | — | — |
| 10 | 850° C. | 0.0013" | $5.057 \times 10^3$ | $6.574 \times 10^3$ | 195.8 | 120° C. |
| 10 | 900° C. | 0.0015" | $3.716 \times 10^3$ | $5.574 \times 10^3$ | 896.2 | 120° C. |
| 11 | 800° C. | 0.0015" | ∞ | — | — | — |
| 11 | 850° C. | 0.0019" | ∞ | — | — | — |
| 11 | 900° C. | 0.0016" | $44.664 \times 10^3$ | $62.530 \times 10^3$ | 964.7 | 120° C. |

TABLE II-continued

| Example | Firing Temperature | Fired Thickness | Resistivity | Normalized Resistivity | TCR PPM/°C. | Top Temperature |
|---|---|---|---|---|---|---|
| 12 | 800° C. | 0.0016" | $3.479 \times 10^3$ | $5.566 \times 10^3$ | 319.1 | 120° C. |
| 12 | 850° C. | 0.0011" | $3.449 \times 10^3$ | $3.794 \times 10^3$ | 265.5 | 120° C. |
| 12 | 900° C. | 0.0013" | $12.787 \times 10^3$ | $16.623 \times 10^3$ | 376.0 | 120° C. |

When Tables I and II are studied in conjunction with each other, it is quite apparent that the presence of $WO_3$ or $MoO_3$ had the effect of sharply reducing the values of TCR. Inexplicably, however, a combination of $WO_3$ and $MoO_3$ did not produce the same effect.

FIG. 1 illustrates the effect upon TCR as a result of varying the mole percent concentration of $WO_3$ in the glass frits combined with $RuO_2$. The effect of the temperature at which the resistor ink was fired upon TCR is also evident from FIG. 1. Thus, it can be observed that TCR was a function of $WO_3$ concentration and resistor ink firing temperature. For example, as the $WO_3$ concentration was increased, the TCR decreased at each firing temperature and exhibited the lowest level for each composition at 800° C. As was noted above, acceptable TCR values are deemed to be within the interval of ±100 ppm/°C., with the ideal value, obviously, being 0 ppm/°C. FIG. 1 demonstrates that a TCR of 0 ppm/°C. can be achieved with this particular frit-$RuO_2$ composition at an optimum firing schedule.

X-ray diffraction (XRD) analyses identified the presence of $PbWO_4$ crystals in the fired resistors that contained $WO_3$ in the frit compositions and indicated that the TCR values decreased with an increase in the quantity of the $PbWO_4$ phase. Furthermore, XRD analyses demonstrated that the concentration of $PbWO_4$ crystals decreased as the firing temperatures were increased, thereby providing an explanation for the observed increase in TCR with higher firing temperatures.

The melting point of $PbWO_4$ is reported in the literature to be 1123° C., well above the firing temperatures employed to fuse the inventive resistor inks. Differential scanning calorimetry (DSC) analysis of Example 9 indicated an exotherm at 575° C. and XRD analysis identified $PbWO_4$ crystals when pressed discs of that glass frit were fired to that temperature in the following fashion:

Room temperature to 450° C. at a rate of 100° C./hour;
Heat from 450° C. to 575° C. at a rate of 50° C./hour;
Hold at 575° C. for 1 hour;
Cool to room temperature at furnace rate.

These data evidence that the $PbWO_4$ phase crystallizes from the glass at a relatively low temperature and begins to redissolve at the higher temperatures required to fuse the resistor inks. Through optimization of the glass frit composition, the $PbWO_4$ phase may be maintainable at higher firing temperatures.

The low TCR values exhibited in commercially-available, high quality, thick film resistors is commonly achieved through what have been termed compensation techniques. For example, in the case of PdO-Ag thick film resistors, the positive TCR of the Ag-Pd is compensated by the negative TCR of PdO. The small TCR values of resistors prepared from inks based upon the use of resinates can be accounted for in a like manner. To illustrate, when the Au-Rh resinate inks are fired, the positive TCR of the gold particles in the thick film resistor is offset by the negative value of lead rhodate formed by a reaction between the rhodium compound and the lead silicate glass during the firing process.

Figure 2:
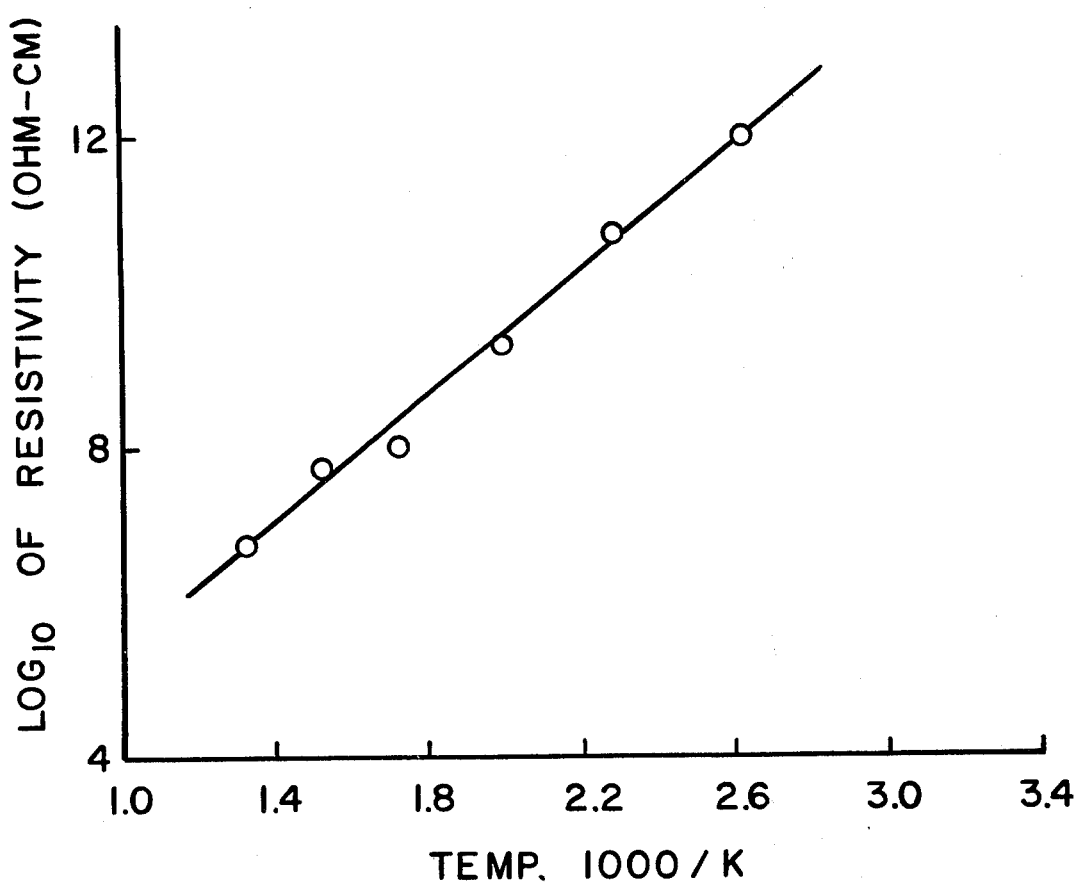
FIG. 2 represents a plot of volume resistivity of a $PbWO_4$ disc versus reciprocal temperature in terms of °K.

To obtain a better understanding of the mechanism providing the low TCR levels in the inventive inks, the volume resistivity of a disc formed from commercially available $PbWO_4$ was investigated. The disc was shpaed by pressing a body from particulate $PbWO_4$, sintering the shape by firing to 800° C. at 100° C./hour, and then cooling to room temperature at furnace rate. FIG. 2 represents a plot of volume resistivity in terms of reciprocal temperature (°K.). As can be observed, the material is semiconducting with a negative TCR. The activation energy for conduction is 0.79 ev. A potential of 10 volts D.C. was applied to the specimen for several minutes at 530° C. No change in resistivity with time was noted, indicating the material to be electronically, rather than ionically, conducting.

Figure 3:
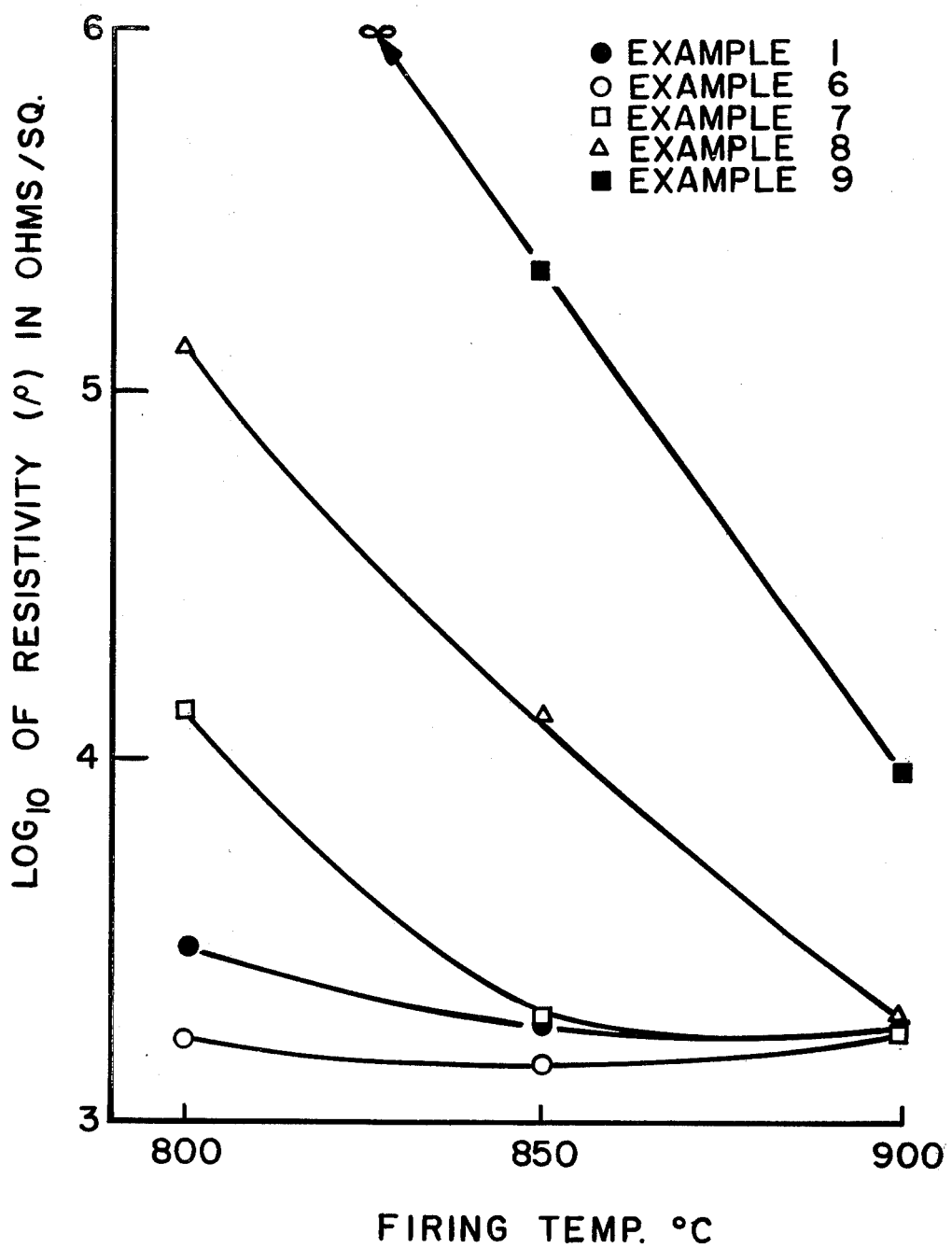
FIG. 3 depicts a plot of resistivity exhibited by several resistor inks versus changes in firing temperature.

FIG. 3 compares the resistivities demonstrated by Examples 1 and 6-9. It is evident that, at the lower firing temperatures, the resistivities are higher than the control glass (Example 1). As the firing temperature was increased, however, the resistivities became lower and all compositions, with the exception of Example 9, had substantially equivalent resistivities at the 900° C. firing level. The higher resistivities exhibited at the lower firing temperatures are believed to be the result of increased glass viscosity resulting from the crystallization of $PbWO_4$. It has been postulated that the increase in glass viscosity reduces flow of the frit and increases the conductive path between the conductive species. Optimization of the frit composition can lead to reduced resistivity at the lower fusing temperatures.

Figure 4:
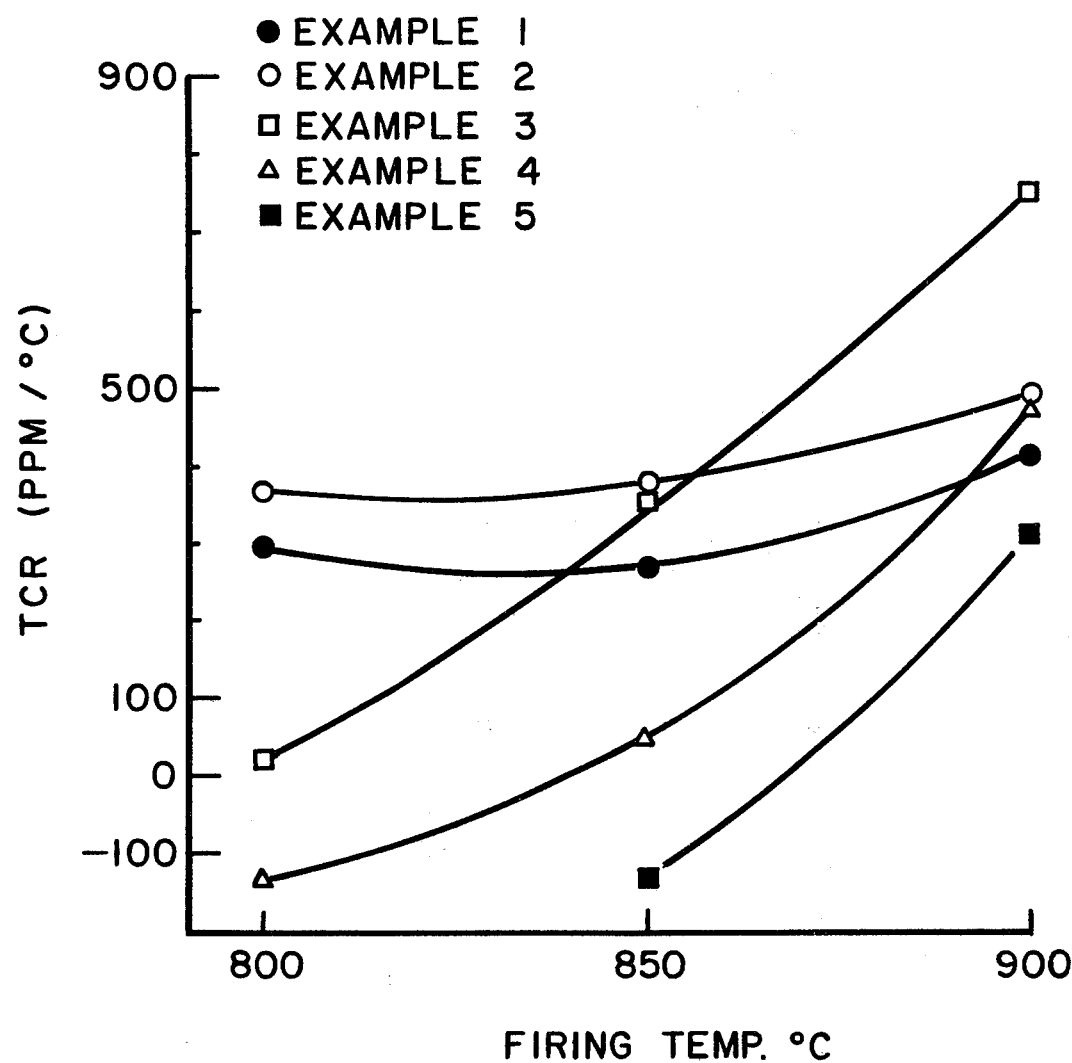
FIG. 4 sets out a plot of TCR displayed by several resistor inks versus changes in firing temperature.
Figure 5:
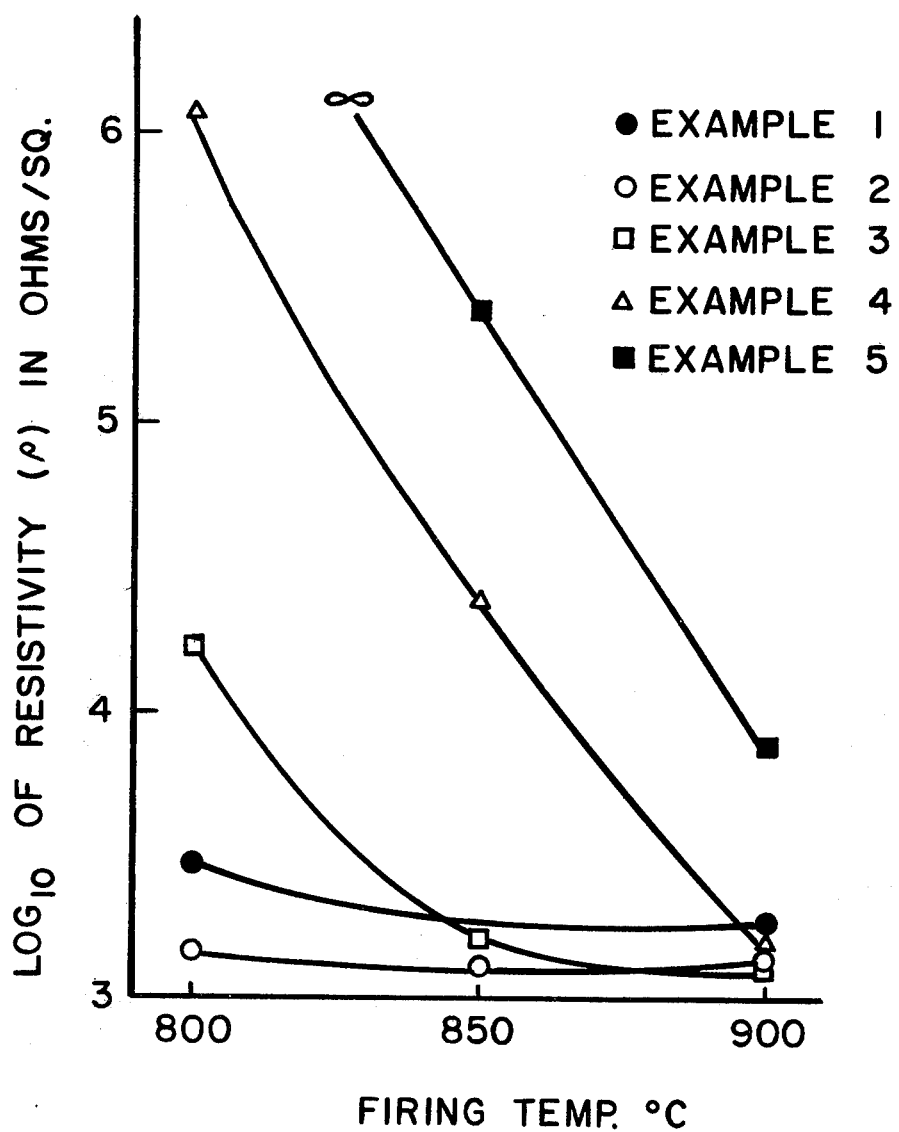
FIG. 5 illustrates a plot of resistivity evidenced by several resistor inks versus changes in firing temperatures.

FIGS. 4 and 5 illustrate the TCR and sheet resistivity, respectively, of Examples 2-5, the $MoO_3$ analogs of the $WO_3$ glasses. The 1 mole percent $MoO_3$ glass (Example 2) showed an unexplained increase in TCR, when compared with Example 1, the control glass, at all temperatures. The $MoO_3$-containing glasses demonstrated a much steeper rise in TCR with higher firing temperatures than the $WO_3$-containing glasses. Moreover, Examples 3 and 4 exhibited higher values of TCR at the 900° C. firing temperature than Example 1. No firm rationale has been developed for understanding those phenomena, but it has been theorized that the sharper increase in TCR may be the result of the $PbMoO_4$ crystals (determined by XRD analysis to be present in Examples 2-5) redissolving in the glass phase at a more rapid rate than the $PbWO_4$ crystals at the temperatures evaluated.

A comparison of the resistivity values of the $WO_3$-containing glasses (Examples 6-9) with those of the $MoO_3$-containing glasses (Examples 2-5) can be made by examining FIGS. 3 and 5. It is believed evident that the resistivities are quite similar.

I claim:

1. Glass frit compositions for use in thick film, $RuO_2$-based resistor inks suitable for application to alumina substrates exhibiting coefficients of thermal expansion approximating that of the alumina substrate material and temperature coefficient of resistance values of less than 100 ppm which consist essentially, expressed in terms of mole percent on the oxide basis, of about 32-39% PbO, 44-47% $B_2O_3$, 14-17% $SiO_2$, and an effective amount of $WO_3$ or $MoO_3$ up to 5%.

2. Glass frit compositions according to claim 1 wherein said $WO_3$ or $MoO_3$ content ranges about 2-4%.

* * * * *